(12) United States Patent
Cheng et al.

(10) Patent No.: US 7,764,171 B2
(45) Date of Patent: Jul. 27, 2010

(54) ADJUSTING A COMMUNICATIONS CHANNEL BETWEEN CONTROL UNIT AND REMOTE SENSOR

(75) Inventors: Chung Ming Cheng, Tusuen Wan (HK); Ho Sin Vincent Chan, Heng Fa Chuen (HK)

(73) Assignee: Computime, Ltd., Hong Kong (HK)

( * ) Notice: Subject to any disclaimer, the term of this patent is extended or adjusted under 35 U.S.C. 154(b) by 285 days.

(21) Appl. No.: 11/860,154

(22) Filed: Sep. 24, 2007

(65) Prior Publication Data

US 2009/0079577 A1 Mar. 26, 2009

(51) Int. Cl.
*G08B 1/08* (2006.01)
(52) U.S. Cl. ............................. 340/539.26; 340/539.1; 455/63.4
(58) Field of Classification Search ............ 340/539.26, 340/539.27, 539.1; 455/63.4
See application file for complete search history.

(56) References Cited

U.S. PATENT DOCUMENTS

| 5,595,342 | A | * | 1/1997 | McNair et al. ............ 340/539.1 |
| 5,771,002 | A | * | 6/1998 | Creek et al. ............ 340/539.21 |
| 5,828,339 | A | * | 10/1998 | Patel .................. 343/700 MS |
| 5,832,296 | A |  | 11/1998 | Wang et al. |
| 6,513,723 | B1 |  | 2/2003 | Mueller et al. |
| 6,990,335 | B1 |  | 1/2006 | Shamoon et al. |
| 7,180,415 | B2 | * | 2/2007 | Bankert et al. ......... 340/539.26 |
| 2003/0112194 | A1 | * | 6/2003 | Watson ................. 343/757 |
| 2004/0070535 | A1 | * | 4/2004 | Olsson et al. ............ 342/459 |
| 2004/0217847 | A1 |  | 11/2004 | Fries et al. |
| 2006/0052059 | A1 | * | 3/2006 | Hyslop .................. 455/63.4 |
| 2006/0079304 | A1 | * | 4/2006 | Hyslop ................ 455/575.7 |
| 2006/0102731 | A1 |  | 5/2006 | Mueller et al. |
| 2007/0013532 | A1 |  | 1/2007 | Ehlers |
| 2007/0030832 | A1 |  | 2/2007 | Gonia et al. |

FOREIGN PATENT DOCUMENTS

| EP | 0635812 A1 | 1/1995 |
| WO | 2006029307 A2 | 3/2006 |

OTHER PUBLICATIONS

International Search Report for PCT/CN2008/072458, dated Dec. 25, 2008, pp. 1-4.

* cited by examiner

*Primary Examiner*—John A Tweel, Jr.
(74) *Attorney, Agent, or Firm*—Banner & Witcoff, Ltd.

(57) ABSTRACT

The present invention provides apparatuses and systems for adjusting a communication channel between a control unit and a remote sensor. A system may include a control unit that controls an environmental unit and a remote sensor that provides data about an environmental factor as measured at the remote sensor. The remote sensor transmits a radio frequency (RF) signal that conveys the data to control unit through a directional antenna. The RF signal is received by the control unit through an omnidirectional antenna, and a signal strength parameter is determined from the received RF signal. A signal strength indication unit provides an indication from the signal strength parameter as a user adjusts the position of the directional antenna. With embodiments of the invention, a signal strength module generates an audio signal in accordance with an audio characteristic, which is indicative of the signal strength of the received RF signal.

27 Claims, 9 Drawing Sheets

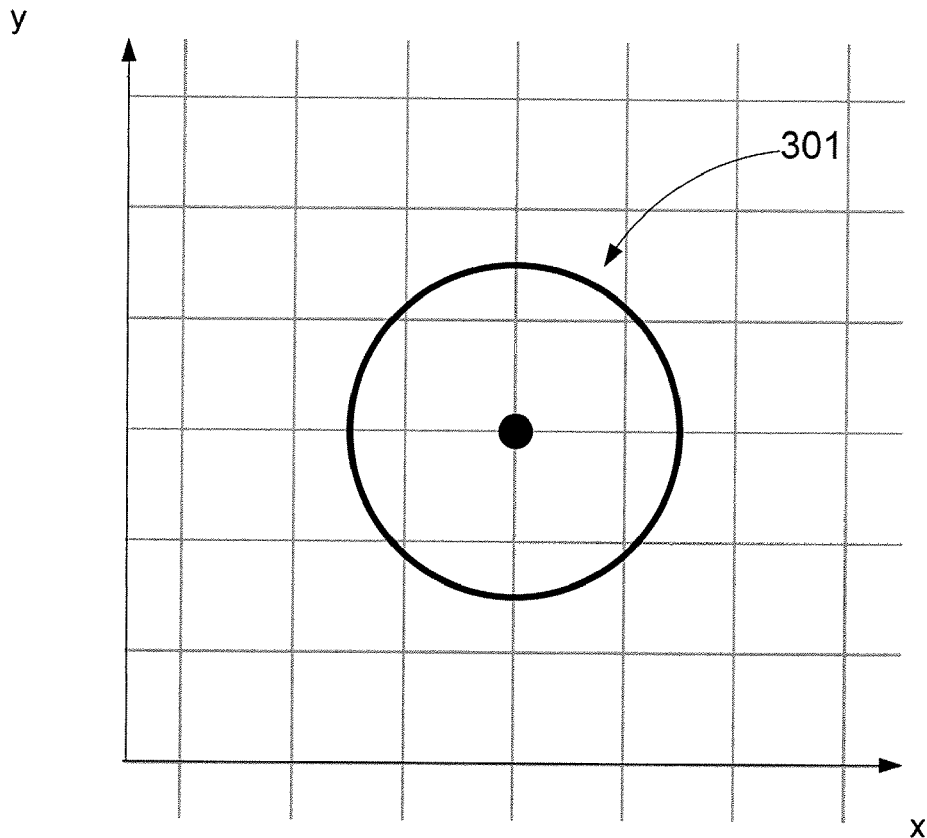
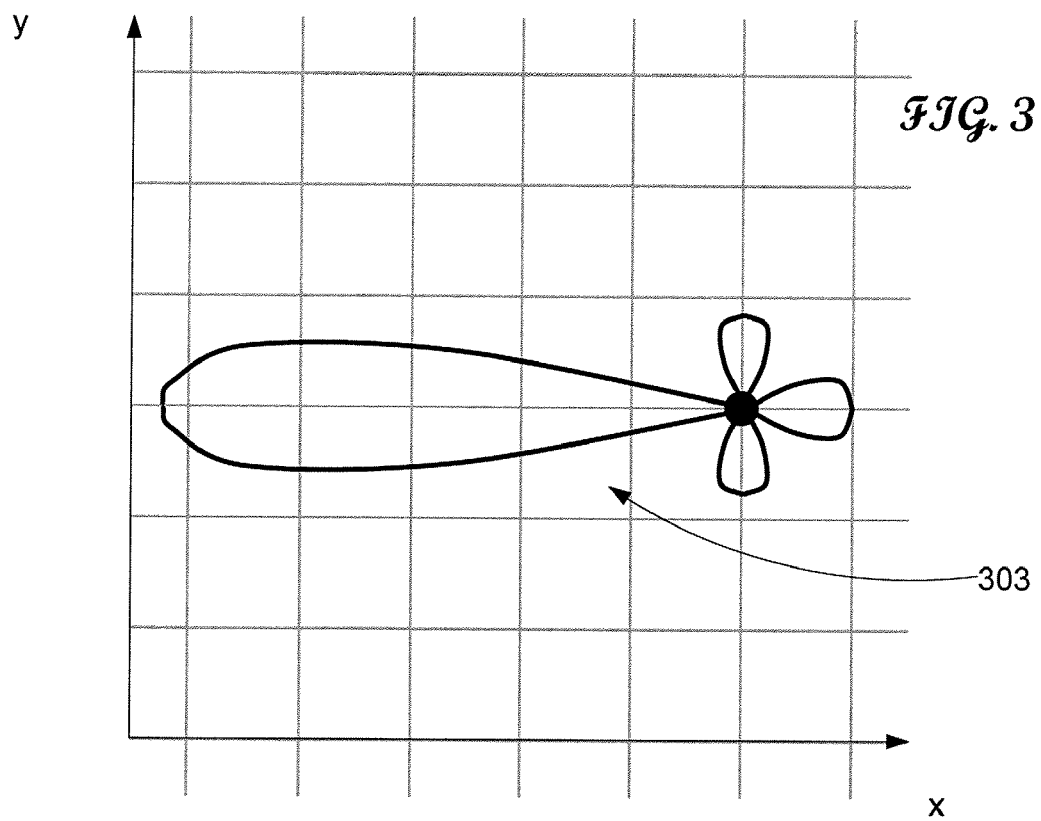
FIG. 3

ADJUSTING A COMMUNICATIONS CHANNEL BETWEEN CONTROL UNIT AND REMOTE SENSOR

FIELD OF THE INVENTION

The present invention relates generally to adjusting a wireless communication channel between a control unit, e.g., a thermostat unit and a remote sensor.

BACKGROUND OF THE INVENTION

A thermostat may be configured with one or more remote temperature sensors in order to monitor locations remote to the thermostat. Because the remote temperature sensors are not integral to the thermostat, the user can freely place the remote sensors at desired locations without restrictions placed by the thermostat's location. With short distances (e.g., a few meters) between the thermostat and the remote sensor, a wire often provides the communication media.

With longer range distances (e.g., over 100 meters), installing a wired connection is often difficult so that a radio frequency (RF) communications channel is typically used. Wireless communications often require that the remote sensors be battery powered so that power consumption is an important consideration. More reliable communications between the remote sensor and the thermostat may require greater power consumption by the remote sensor's transmitter, reducing the battery life. Also, government regulations may impose a maximum radiated power limiting the range between the thermostat and the remote sensor. Moreover, indoor wireless communications is often affected by the structure of the building, in which a radio signal may be adversely affected by reflection and absorption characteristics. Improving the quality of communications between the thermostat and the remote sensor in the context of the above considerations is desirable.

SUMMARY OF THE INVENTION

The present invention provides systems and apparatuses for adjusting a communication channel between a control unit and a remote sensor.

With one aspect of the invention, a system includes a control unit that controls an environmental, e.g., a heating, ventilation, and air conditioning (HVAC) unit, and a remote sensor that provides data about an environmental factor as measured at the remote sensor. The remote sensor transmits a radio frequency (RF) signal that conveys the data to control unit through a second antenna. The RF signal is received by a receiving module at the control unit through a first antenna, and a signal strength parameter is determined from the received RF signal. A signal strength indication unit provides an indication from the signal strength parameter.

With another aspect of the invention, a control unit comprises a thermostat unit, where a remote sensor provides data about a temperature that is measured at the remote sensor's location.

With another aspect of the invention, a signal strength module generates an audio signal in accordance with an audio characteristic. The audio characteristic is indicative of the signal strength of the received RF signal.

With another aspect of the invention, the audio characteristic characterizes a sequence of audio tones (e.g., "audio beeps").

With another aspect of the invention, the audio characteristic characterizes a frequency of audio tones.

With another aspect of the invention, a signal strength indication module includes a visual display that provides a visual indication of the signal strength of the received RF signal.

With another aspect of the invention, a remote sensor includes a pivoting component in order to alter a position of the remote sensor's antenna responsive to an external force. The pivoting component may include a pivoting axis and may further include a retaining protrusion that fits into one of a plurality of retaining receptacles.

With another aspect of the invention, the first antenna at the control unit comprises an omnidirectional antenna, and the second antenna at the remote sensor comprises a directional antenna.

With another aspect of the invention, a remote sensor includes an activation module to activate or deactivate the remote sensor in response to an input from a user. The activation module may further select a test mode or a normal mode.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

FIG. 3 shows exemplary antenna patterns for antennas utilized in communicating between a remote sensor and a thermostat unit in accordance with an embodiment of the invention.

DETAILED DESCRIPTION OF INVENTION

Figure 1:
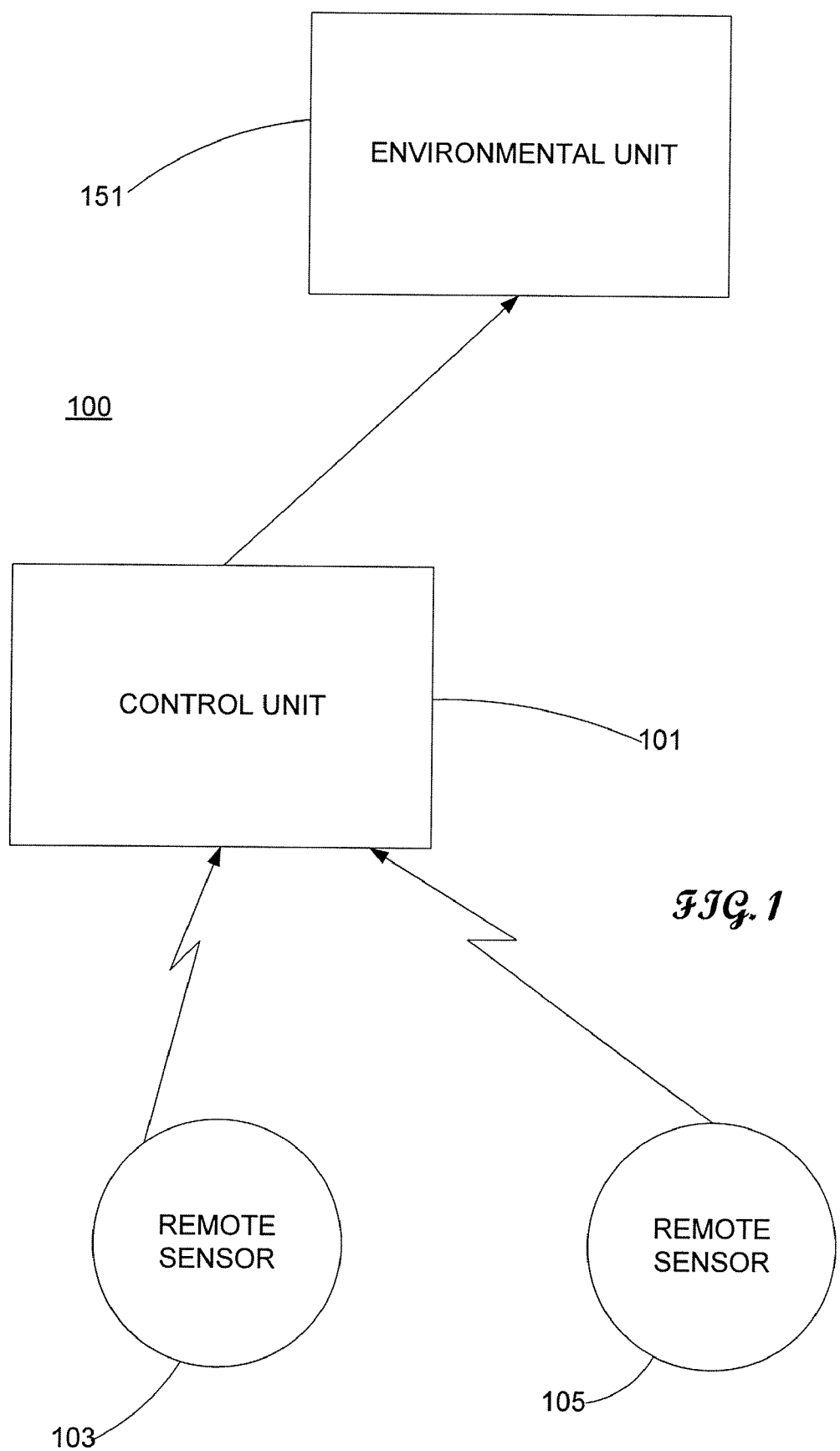
FIG. 1 shows an architecture for controlling an environmental factor in accordance with an embodiment of the invention.

FIG. 1 shows an architecture 100 for controlling an environmental factor in accordance with an embodiment of the invention. Control unit 101 controls environmental unit 151 to affect an environmental factor of an environmentally-controlled space (e.g., a room or a portion of a building). Environmental unit 151 may affect one or more environmental factors, including temperature, humidity, and air quality. Environmental unit 151 may assume different forms, including a heating, ventilation, and air-conditioning (HVAC) unit. A HVAC unit is sometimes referred to as "climate control" and is particularly important in the design of medium to large industrial and office buildings such as sky scrapers and in marine environments such as aquariums, where humidity and temperature must all be closely regulated while maintaining safe and healthy conditions within.

The three functions of heating, ventilation, and air-conditioning are closely interrelated. All the functions seek to provide thermal comfort, acceptable indoor air quality, and reasonable installation, operation, and maintenance costs. HVAC systems can provide ventilation, reduce air infiltration, and maintain pressure relationships between spaces.

Because an environmentally-controlled space may be characterized by a variation of an environmental factor, it may be desirable to distribute one or more sensors throughout the environmentally-controlled space. With exemplary architecture 100, remote sensors 103 or 105 communicate with control unit 101 over radio channels, while control unit 101 and environmental unit 151 communicate over a wire connection. With embodiments of the invention, communication is often one way from remote sensor 103 or 105 to control unit 101 (providing measured environmental information to the control unit), although two-way communications may be supported.

Figure 2:
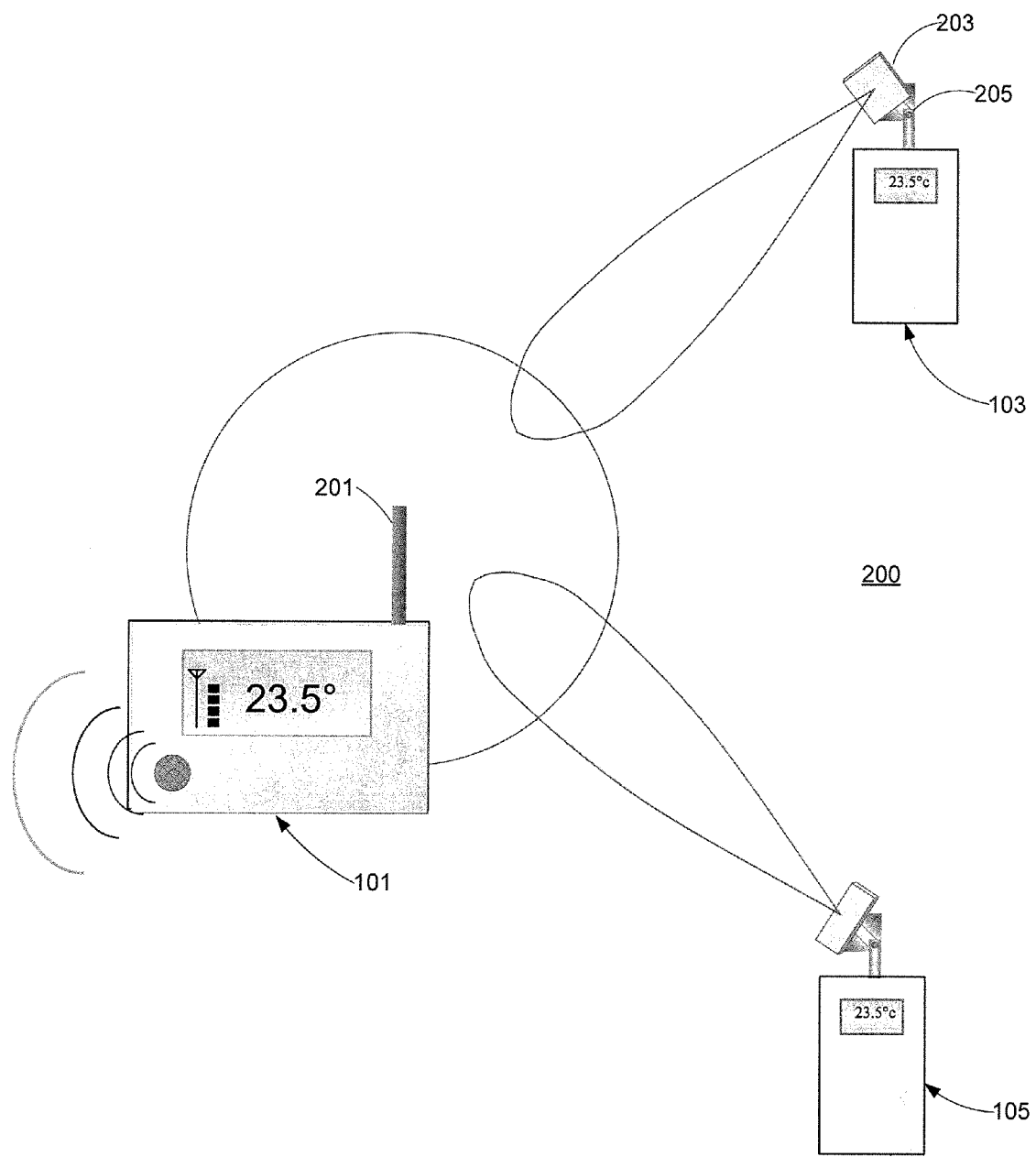
FIG. 2 shows a system with a thermostat unit that receives temperature information from remote sensors in accordance with an embodiment of the invention.

FIG. 2 shows system 200 with thermostat unit 101 that receives temperature information from remote sensors 103 and 105 in accordance with an embodiment of the invention. The signal quality for the radio channels between sensors 103 or 105 and thermostat 101 typically is unknown at the time of initial installation. Remote sensors 103 and 105 are distributed at different points of an environmentally-controlled space, e.g. building room. With applications, e.g., remote sensor to thermostat communications, the communications channel is either "connected" or "disconnected." The user typically does not know the actual reception quality. It is possible that the connection is only marginal and that a good connection in the long term cannot be guaranteed. Thus, it is often beneficial to provide feedback of the signal quality to the user as the user is adjusting a radio channel between remote sensor 103 or 105 and thermostat 101. Frequencies of operation are often those exempted from license, e.g., 315 MHz (US), 433 MHz/868 MHz (UK, Europe), as well as 2.4 GHz. High radio frequencies are more susceptible to signal fading by the structure of a building, in which adjustable transmission direction becomes more important. Embodiments of the invention may utilize optical frequencies (e.g., in the infrared as the communication media) where the direction of an infrared LED can be adjusted at the transmitter until the received signal is the strongest. However, operation at optical frequencies typically works at line of sight, which may not be suitable for indoor use.

Because remote sensor 103 (transmitting measured information regarding the measured temperature) and thermostat unit 101 (receiving the measured information) are typically stationary after installation, directional antenna 203 may have a high antenna gain and thus a longer communication distance.

With embodiments of the invention, thermostat unit 101 utilizes an omnidirectional antenna (corresponding to vertical antenna 201) when configuring system 100 to facilitate communication with a plurality of remote sensors. However, to support an increased range of communication, remote sensors 103 and 105 utilize directional antennas since remote sensors 103 and 105 are not typically mobile after installation. With embodiments of the invention, the transmission distance for a given transmission power may also be obtained by increasing the sensitivity of the receiver.

When adjusting a communications channel between remote sensor 103 and thermostat unit 101, a directional antenna 203 is pivoted with pivoting component 205 by the user applying an external force to adjust the antenna's position. The user continues to adjust the antenna's position until an adequate signal strength (e.g., an approximately maximum signal strength with respect to other antenna positions) is established on the communications channel. The user similarly adjusts the communications channel between remote sensor 205 and thermostat unit 101.

Pivoting component 205 allows the user to freely adjust antenna 203 in one or more directions. Additionally, pivoting component 205 may include a retaining protrusion that fits into one of a plurality of retaining receptacles so that the position of antenna 203 is maintained after the user has removed the external force.

With embodiments of the invention, adjusting a communication channel between remote sensor 103 and thermostat 101 includes:

Adjusting directional antenna 203 with pivoting component 205: Antenna 203 is pivoted so that it can be freely adjusted to find the best direction. For the same RF output power, a longer transmission distance can be obtained at the direction of the main lobe of antenna 203 (referencing exemplary antenna pattern 303 as shown in FIG. 3). Thermostat unit 101 uses omnidirectional antenna 201 (referencing exemplary antenna pattern 301 as shown in FIG. 3). For more than one remote sensor, omnidirectional antenna 203 enables thermostat unit 101 to receive RF signal from remote sensors 103 and 105 in any direction. Thermostat 101 may use an omnidirectional antenna for several reasons: 1) To receive remote sensors from different directions and 2) Ease of adjustment because only the remote sensor antenna is adjustable. However, with embodiments of the invention thermostat 101 may use a directional antenna to increase the communications range if there is only one remote sensor.

Thermostat unit 101 provides an indication of the relative signal strength, as will be further discussed. For example, thermostat unit 101 may provide an audible indication. Alternatively, as illustrated in FIG. 2, thermostat 101 may have a display with a graphic representation of the relative signal strength. The user may use the indication as a reference to adjust the direction of directional antenna 203 and to determine the best installation location of remote sensor 103 and thermostat unit 101.

FIG. 3 shows exemplary antenna patterns for antennas 201 and 203 utilized in communicating between remote sensor 103 and thermostat unit 101 (as shown in FIG. 2) in accordance with an embodiment of the invention. Exemplary antenna pattern 301, corresponding to omnidirectional antenna 201 (as shown in FIG. 2) has approximately the same directional characteristics (equal gain) in a horizontal plane (corresponding to the x and y directions). Exemplary antenna pattern 303, corresponding to directional antenna 203, has a higher gain in one or more directions. Antenna pattern 303 has a main lobe in the negative x direction with side lobes in the positive x direction, positive y direction, and negative y direction.

Directional antenna 203 radiates greater power in one or more directions allowing for increased gain performance, thus providing greater communications reliability between remote sensor 103 and thermostat unit 101. The main lobe of directional antenna 203 typically is in the direction from remote sensor 103 to thermostat unit 101. Embodiments of the invention may support different types of directional antennas, including microstrip antennas, patch antennas, yagi antennas, loop antennas, and corner reflector antennas.

Figure 4:
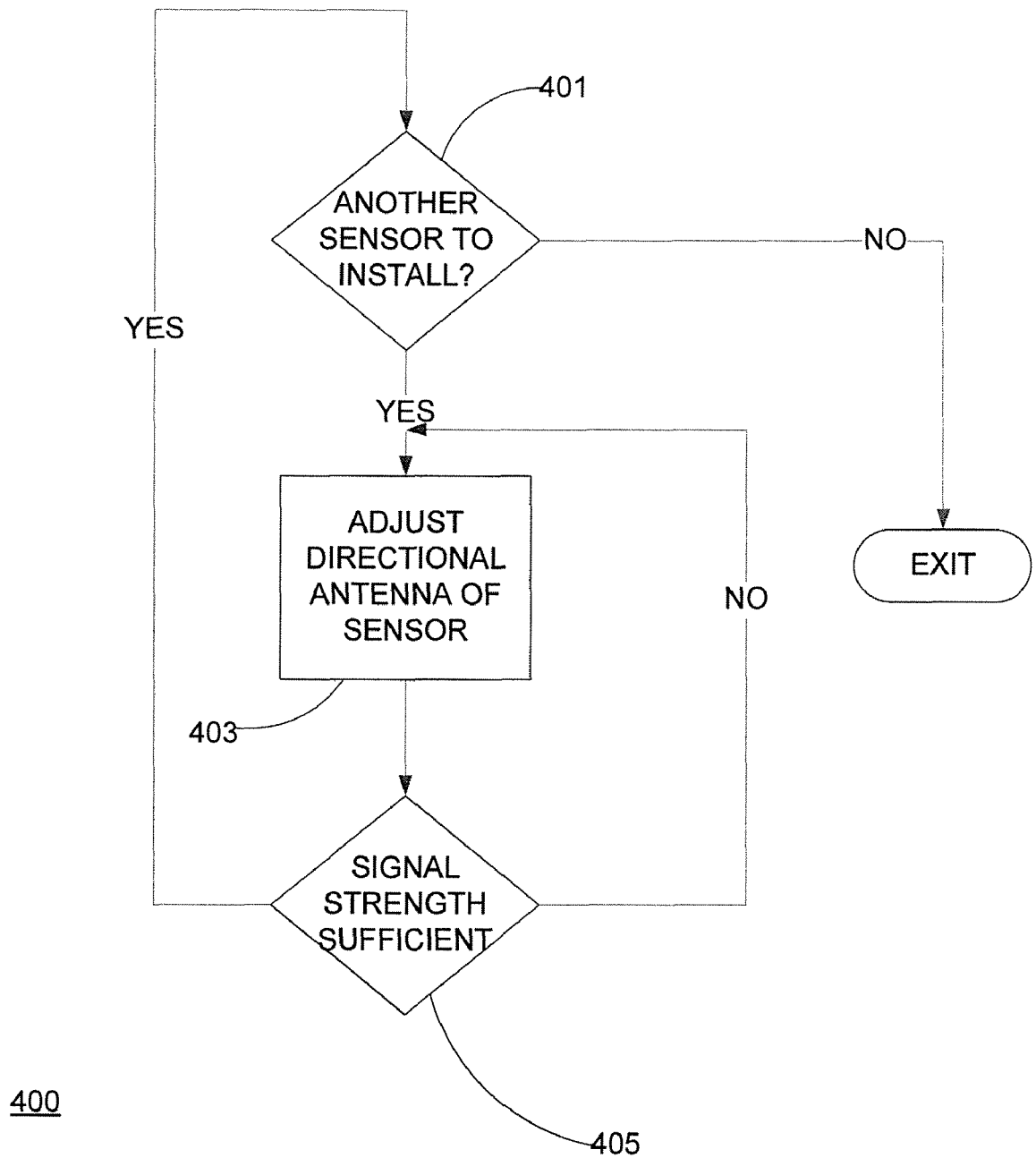
FIG. 4 shows a flow diagram for adjusting a directional antenna of the remote sensor in accordance with an embodiment of the invention.

FIG. 4 shows flow diagram 400 for adjusting directional antenna 203 of remote sensor 103 in accordance with an embodiment of the invention. Referring to FIG. 2, if a remote sensor (e.g., remote sensor 103) is being installed as determined by step 401, a user adjusts directional antenna 203 about pivoting point 205 in step 403. As will be further discussed, thermostat unit 101 provides an indication (e.g., visual or audible) of the signal strength of the received RF signal. If the user determines that the signal strength is sufficient (e.g., approximately maximum over the adjustable positions of directional antenna 203) in step 405, the configuration for remote sensor is complete. The user proceeds to adjust another remote sensor.

Referring to the exemplary embodiment as shown in FIG. 2, thermostat unit 101 utilizes omnidirectional antenna 201 so that the adjustment of one remote sensor does not interact with the adjustment of another remote sensor.

Figure 5:
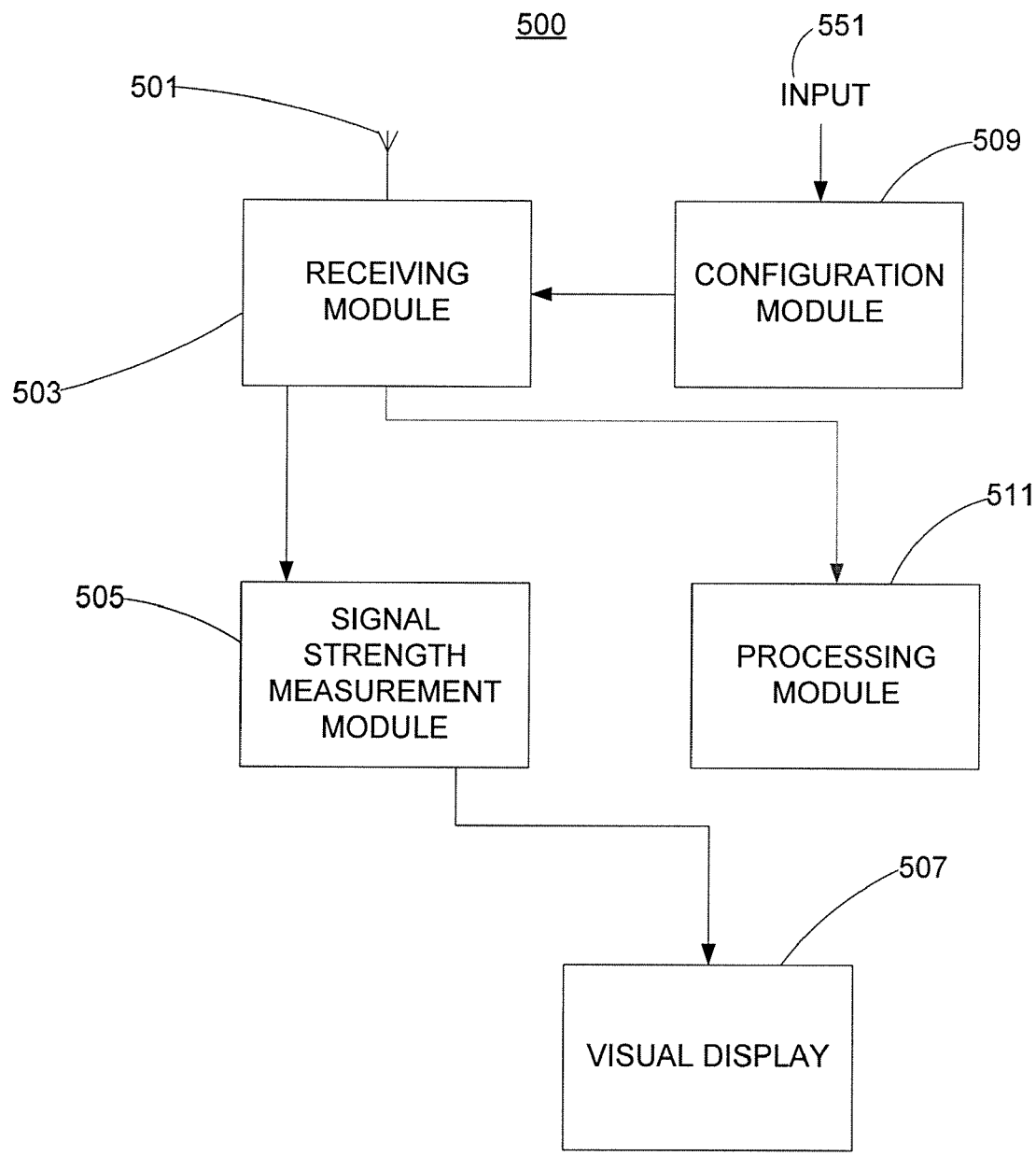
FIG. 5 shows a first architecture of a thermostat unit in accordance with an embodiment of the invention.

FIG. 5 shows first architecture 500 of thermostat unit 101 in accordance with an embodiment of the invention. A radio signal from a remote sensor is received through antenna 501 through receiving module 503.

The user may configure thermostat unit 101 to be in a test mode or normal mode by entering input 551 through configuration module 509. If thermostat unit 101 is in the test mode, a received RF signal is measured and a corresponding indication is displayed as will be discussed. If thermostat 101 is in the normal mode, the received RF signal is processed by processing module 511 so that information about a measured environmental factor (e.g., the measured temperature) at the remote sensor is processed by thermostat unit 101 to control environmental unit 151.

Signal strength measurement module 505 determines a signal strength parameter that is indicative of the received RF signal. Signal strength measurement module 505 may assume different forms in accordance with embodiments of the invention. For example, module 505 may comprise a bandpass filter that passes a signal at the desired RF frequency and a diode configuration that rectifies the RF signal. A resulting DC voltage (which corresponds to the signal strength parameter) is related to the signal strength of the received RF signal.

Visual display 507 provides a visual display in accordance with the signal strength parameter. As shown in FIG. 2, thermostat 101 includes a vertical portion of the display to provide a visual indication of the signal strength of the received RF signal. For example, the vertical portion displays from zero to five square segments, where five square segments indicate an excellent signal quality, only one square segment indicates a very poor signal quality, and no square segments indicate no received signal at all.

Figure 6:
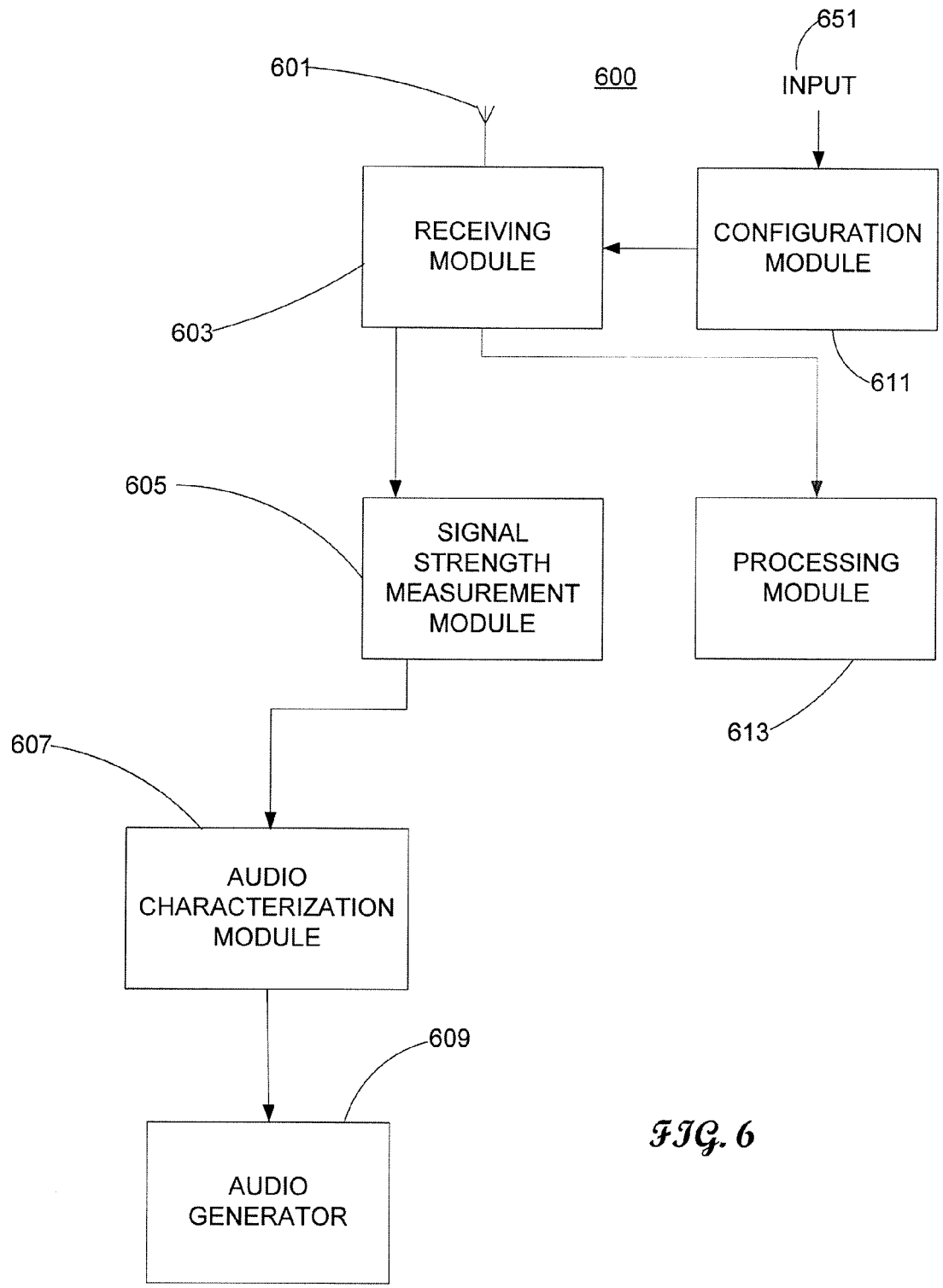
FIG. 6 shows a second architecture of a thermostat unit in accordance with an embodiment of the invention.

FIG. 6 shows second architecture 600 of thermostat unit 101 in accordance with an embodiment of the invention. Similar to architecture 500, a radio signal from a remote sensor is received through antenna 601 through receiving module 603.

The user may configure thermostat unit 101 to be in a test mode or normal mode by entering input 651 through configuration module 611. If thermostat unit 101 is in the test mode, a received RF signal is measured and a corresponding audible indication is provided as will be discussed. If thermostat 101 is in the normal mode, the received RF signal is processed so that information about a measured environmental factor (e.g., the measured temperature) at the remote sensor is processed by thermostat unit 101 to control environmental unit 151.

When in the normal mode, thermostat unit 101 may not provide a signal indication if the indication is not desired by the user.

Signal strength measurement module 605 determines a signal strength parameter that is indicative of the received RF signal.

Audio generator 609 provides an audible indication (an audio signal) in accordance with an audio characteristic provided by audio characterization module 607. The audible indication may facilitate the adjustment of the RF communications channel from remote sensor 103 or 105 to thermostat 101 if a visual display would not be sufficiently visible to the user.

Audio characterization module 607 obtains the signal strength parameter from signal strength module 605 and determines an audio characteristic from the parameter. With embodiments of the invention, the frequency of a generated audio signal is related to the signal strength of the received signal as shown in Table 1. (Tables 1-3 show different aspects of providing an audible signal when adjusting the communication channel between remote sensor 103 or 105 and thermostat 101. The values shown in Tables 1-3 are exemplary. Embodiments of the invention may use different values.) With embodiments of the invention, the higher the frequency, the greater the signal strength of the received RF signal.

TABLE 1

| AUDIO CHARACTERISTIC - FUNDAMENTAL FREQUENCY OF AUDIO SIGNAL | |
|---|---|
| Signal Strength | Frequency |
| Excellent | 4000 Hz |
| Good | 2000 Hz |
| Fair | 1000 Hz |
| Poor | 500 Hz |
| Very Poor | 250 Hz |
| No signal received | No sound |

Embodiments of the invention may utilize other audio characteristics. For example, audio generator 609 may generate an audio signal with a sequence of tones (e.g., "beep-beep-...") that are repeated periodically. Each sequence may include from one to five beeps, where a sequence of five beeps is indicative of excellent signal strength and a sequence of one beep is indicative of very poor signal strength as shown in Table 2.

TABLE 2

| AUDIO CHARACTERISTIC - SEQUENCE OF TONES | |
|---|---|
| Signal Strength | Number of tones in a sequence |
| Excellent | 5 beeps: bbbbb-bbbbb-bbbbb . . . |
| Good | 4 beeps: bbbb-bbbb-bbbb . . . |
| Fair | 3 beeps: bbb-bbb-bbb . . . |
| Poor | 2 beeps: bb-bb-bb . . . |
| Very Poor | 1 beep: b-b-b . . . |
| No signal received | No beep |

As another example, audio generator 609 may generate an audio signal with repetitious tones (beeps), in which the frequency of audio tones (as shown below) (e.g., beeps) is related to the signal strength as shown in Table 3. The more frequent that the beeps are generated, the greater the signal strength of the received RF signal.

TABLE 3

AUDIO CHARACTERISTIC - FREQUENCY OF TONES

| Signal Strength | Frequency |
| --- | --- |
| Excellent | 8 beeps per second |
| Good | 4 beeps per second |
| Fair | 2 beeps per second |
| Poor | 1 beep per second |
| Very Poor | 1 beep every 2 seconds |
| No signal received | No beep |

Figure 7:
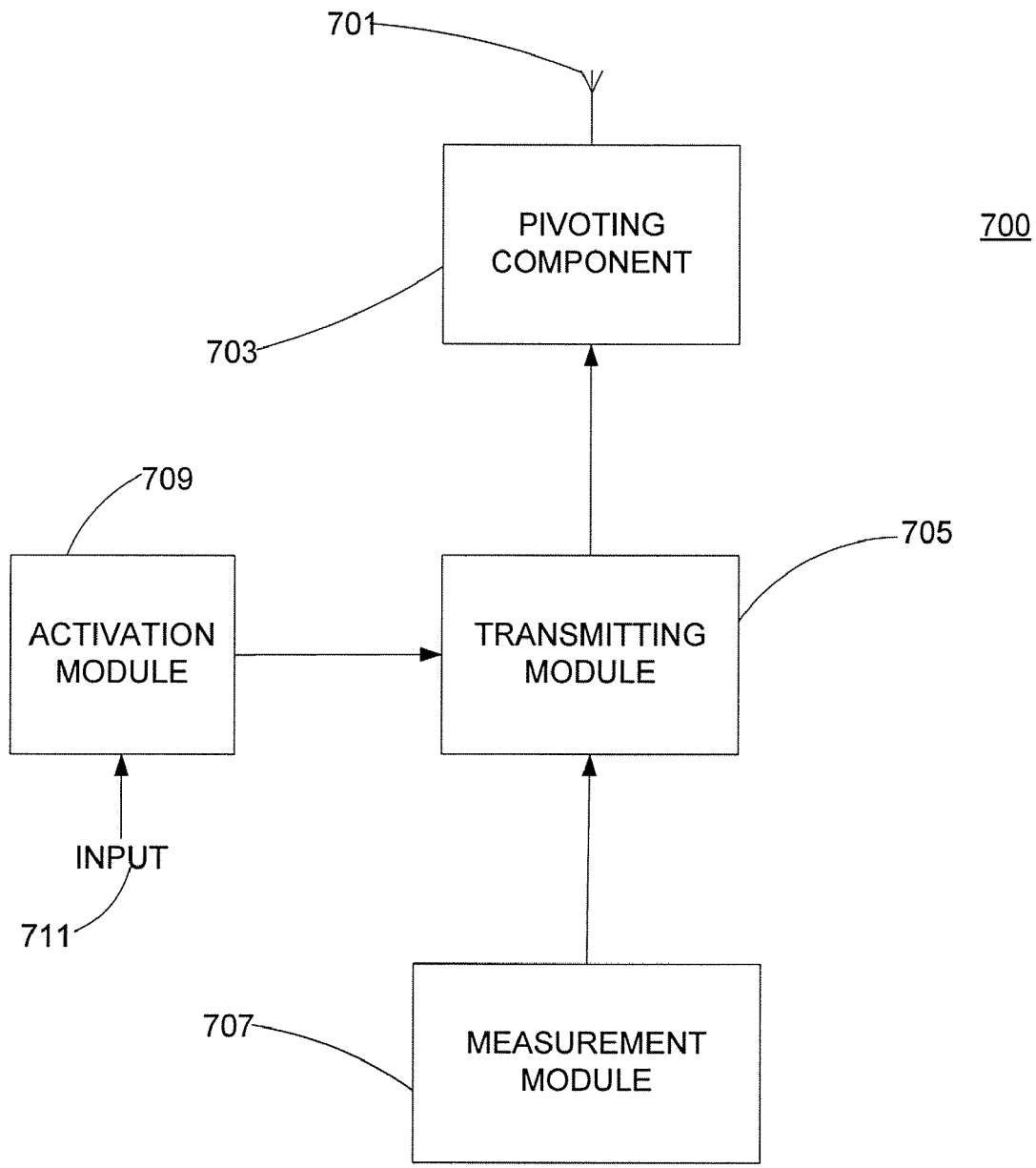
FIG. 7 shows an architecture of a remote sensor in accordance with an embodiment of the invention.

FIG. 7 shows an architecture 700 of remote sensor 103 in accordance with an embodiment of the invention. Measurement module 707 measures the temperature at the sensor's location. Remote sensor 103 conveys the measured temperature to thermostat 101 by generating an RF signal by transmitting module 705 through directional antenna 701. Pivoting component 703 enables the user to position directional antenna 701 as previously discussed.

The user may configure remote sensor 103 to operate in a test mode or in a normal mode by entering input 711 through activation module 709. For example, when operating in the normal mode, remote sensor 103 may send a message to thermostat unit 101 only when the temperature changes in order to conserve electrical power. With a plurality of remote sensors (e.g., remote sensors 103 and 105), only one remote sensor at a time is typically configured in the test mode. When operating in the test mode, remote sensor 103 may periodically send a message to thermostat unit 101 so that the user is provided an indication as the user adjusts directional antenna 203. With embodiments of the invention, remote sensor 103 may include a test indicator in the message so that thermostat unit 101 may distinguish between a test message from a regular message as will be discussed.

Figure 8:
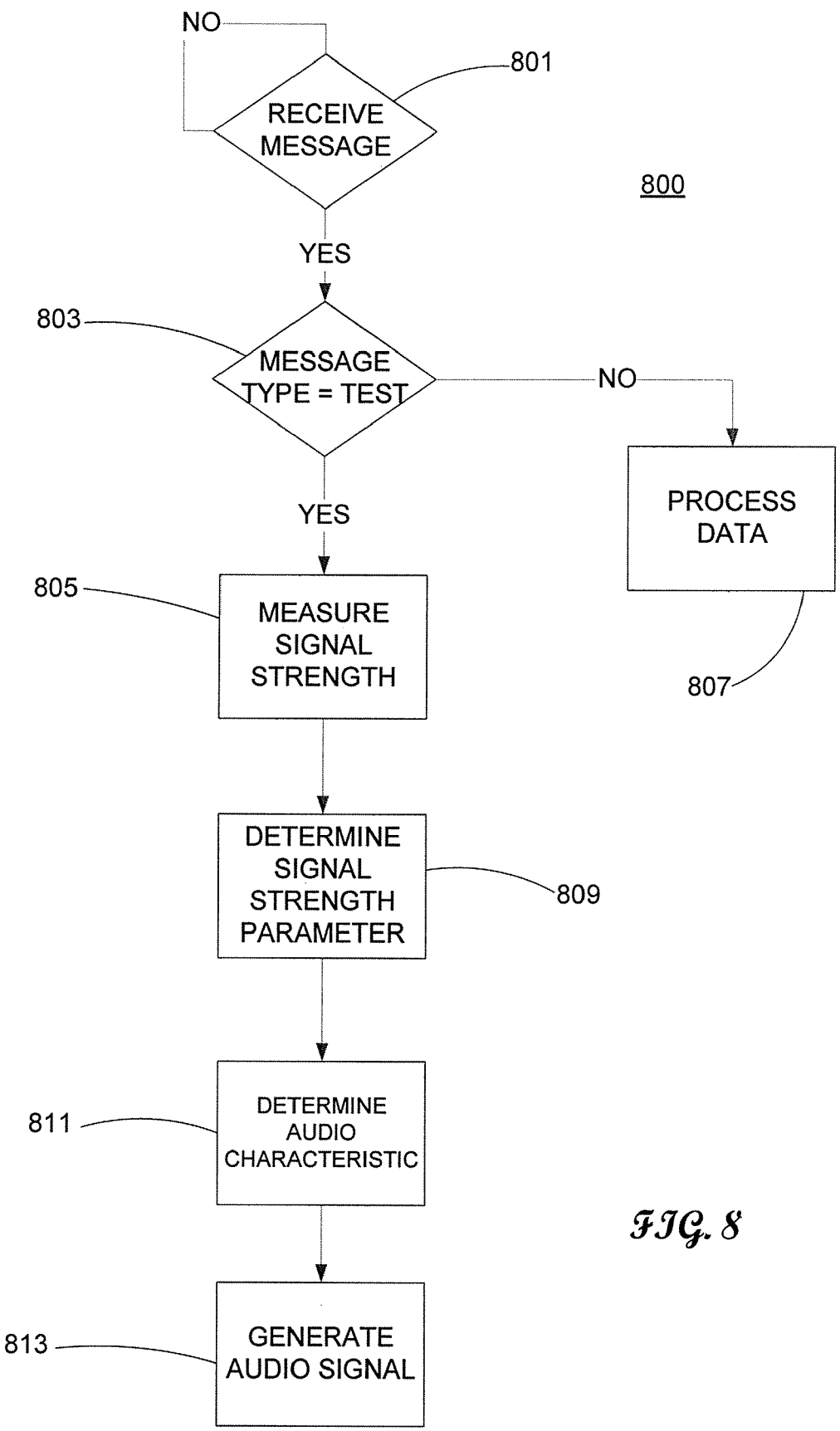
FIG. 8 shows a flow diagram for processing a received RF signal by a control unit in accordance with an embodiment of the invention.

FIG. 8 shows flow diagram 800 for processing a received RF signal by thermostat unit (control unit) 101 in accordance with an embodiment of the invention. If step 801 determines that a message has been received from a remote sensor, process 800 advances to step 803. If the received message is not a test message, thermostat unit 101 processes the message and controls environmental unit 151 in accordance with the received information in step 807. If the received message is a test message as determined by step 803, the signal strength of the received RF signal is measured in step 805 (e.g., as performed by module 605 as shown in FIG. 6) and a signal strength parameter is determined in step 809. (A test message may be distinguished from a normal message by a test indicator in the message.) In step 811, an audio characteristic is determined (e.g., as performed by module 607), and an audio signal is generated in step 813 in accordance with the audio characteristic.

Figure 9:
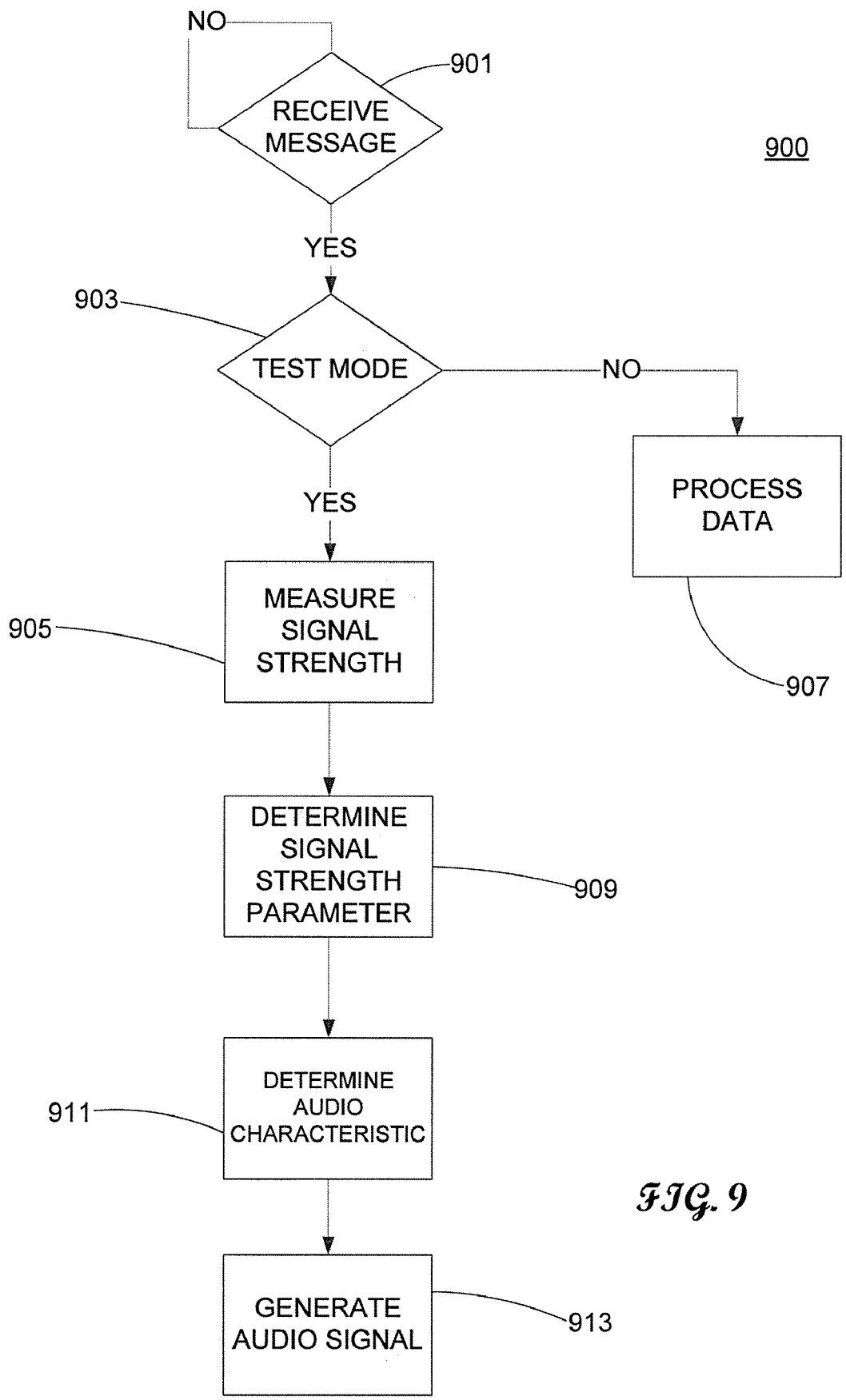
FIG. 9 shows a flow diagram for processing a received RF signal by a control unit in accordance with an embodiment of the invention.

FIG. 9 shows flow diagram 900 for processing a received RF signal by a control unit 101 in accordance with an embodiment of the invention. Steps 901 and 905-913 are similar to steps 801 and 805-813 are previously discussed. With step 903, if thermostat unit 101 is in the test mode, the signal strength of the received RF signal is determined and displayed in steps 905 and 909-913. Otherwise, the received message is processed in order to control environmental unit 151 in accordance with environmental information from the remote sensor. Thermostat unit 101 may be configured in the test mode or the normal mode by a user entering an input through configuration module 611 as previously discussed.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a control unit configured to control an environmental unit, the environmental unit affecting an environmental factor, the control unit including:
        a first antenna;
        a receiving module configured to receive a received radio frequency (RF) signal from a first remote sensor through the first antenna;
        a signal measurement module configured to determine a signal strength parameter, the signal strength parameter being indicative of a signal strength of the received RF signal; and
        a signal strength indication unit configured to provide an indication from the signal strength parameter;
    the first remote sensor positioned at a first location, the first remote sensor including:
        a second antenna;
        a transmitting module configured to convey a first datum in a first transmitted RF signal through the second antenna to the control unit about the environmental factor that is measured at the first location; and
        an adjustable component configured to alter a position of the second antenna; and
    the signal strength parameter being indicative of an optimum positioning of the second antenna.

2. The system of claim 1, the control unit comprising a thermostat unit and the environmental factor being indicative of temperature.

3. The system of claim 1, wherein the environmental factor is indicative of humidity.

4. The system of claim 1, wherein the environmental factor is indicative of air quality.

5. The system of claim 1 further comprising:
    an audio characterization module configured to determine an audio characteristic of an audio signal that is indicative of the signal strength parameter; and
    an audio generator configured to generate the audio signal in accordance with the audio characteristic.

6. The system of claim 1 further comprising:
    a visual display configured to provide a visual indication of the signal strength indicator.

7. The system of claim 1, further comprising:
    a pivoting component configured to alter the position of the second antenna responsive to an external force.

8. The system of claim 7, the pivoting component including a pivoting axis.

9. The system of claim 8, the pivoting component further including:
    a retaining protrusion; and
    a plurality of retaining receptacles, the retaining protrusion fitting into one of the plurality of retaining receptacles to alter the position of the second antenna.

10. The system of claim 1, the first antenna comprising an omnidirectional antenna and the second antenna comprising a directional antenna.

11. The system of claim 1, further comprising:
a second remote sensor positioned at a second location, the second remote sensor including:
a third antenna; and
a second transmitting module configured to convey a second datum in a second transmitted RF signal through the third antenna to the control unit about the environmental factor that is measured at the second location.

12. The system of claim 11, the first remote sensor further including a first activation module configured to activate or deactivate the first remote sensor and the second remote sensor including a second activation module configured to activate or deactivate the second remote sensor.

13. The system of claim 12, the first activation module and the second activation module further configured to select a test mode or a normal mode of operation.

14. The system of claim 1, the receiving module further configured to select a test mode or a normal mode and to provide the indication only when operating in the test mode.

15. The system of claim 14, the receiving module further configured to select the test mode when a test message is received.

16. An apparatus comprising:
a control unit configured to control a temperature control system in accordance with a desired temperature and a measured temperature;
a first antenna having a fixed position;
a receiving module configured to receive a received radio frequency (RF) signal from a first remote sensor through the first antenna, the received RF signal conveying information about the measured temperature;
a signal measurement module configured to determine a signal strength parameter, the signal strength parameter being indicative of a signal strength of the received RF signal and indicative of an optimum positioning of a transmitting source of the received RF signal; and
an audio generator configured to provide an audio indication from the signal strength parameter.

17. The apparatus of claim 16, further comprising:
an audio characterization module configured to determine an audio characteristic of an audio signal to provide the audio indication.

18. The apparatus of claim 17, the audio characterization module configured to determine a frequency of the audio signal in accordance with the signal strength parameter.

19. The apparatus of claim 17, the audio characterization module configured to determine a number of audio tones in a sequence.

20. The apparatus of claim 17, the audio characterization module configured to determine a frequency of audio tones.

21. An apparatus comprising:
a measurement module configured to determine a measured temperature at a location;
a directional antenna;
a transmitting module configured to convey information in a radio frequency (RF) signal through the antenna to a thermostat unit about the measured temperature to a control unit; and
a pivoting component configured to alter a position of the antenna in response to an external force to obtain a desired signal performance at the control unit.

22. The apparatus of claim 21, the pivoting component including a pivoting axis.

23. The apparatus of claim 22, the pivoting component further including:
a retaining protrusion; and
a plurality of retaining receptacles, the retaining protrusion fitting into one of the plurality of retaining receptacles to alter the position of the second antenna.

24. The apparatus of claim 22, the directional antenna comprising a patch antenna.

25. The apparatus of claim 22, the directional antenna comprising a microstrip antenna.

26. The apparatus of claim 21 further comprising:
a configuration module being capable of configuring the apparatus in a test mode or normal mode; and
the transmitter module configured to insert a test indicator in a transmitted message only when the apparatus is in the test mode.

27. The system of claim 1, further comprising:
another remote sensor positioned at another position, the other remote sensor including:
another antenna;
another transmitting module configured to convey another datum in another transmitted RF signal through the other antenna to the control unit about the environmental factor that is measured at the other location; and
another adjustable component configured to position the other antenna; and
the signal strength parameter being indicative of an optimum positioning of the other antenna, wherein the signal strength parameter is determined by the signal measurement module at the control unit.

* * * * *